United States Patent
Fischer et al.

(10) Patent No.: US 10,551,802 B2
(45) Date of Patent: Feb. 4, 2020

(54) METHOD AND APPARATUS FOR OPERATING A TECHNICAL SYSTEM

(71) Applicant: SIEMENS AKTIENGESELLSCHAFT, München (DE)

(72) Inventors: Jan Fischer, München (DE); Andreas Pirsing, Sommerfeld (DE); Tim Schenk, Landshut (DE); Annelie Sohr, München (DE)

(73) Assignee: Siemens Aktiengesellschaft (DE)

( * ) Notice: Subject to any disclaimer, the term of this patent is extended or adjusted under 35 U.S.C. 154(b) by 97 days.

(21) Appl. No.: 15/761,149

(22) PCT Filed: Sep. 16, 2016

(86) PCT No.: PCT/EP2016/072005
§ 371 (c)(1),
(2) Date: Mar. 19, 2018

(87) PCT Pub. No.: WO2017/050659
PCT Pub. Date: Mar. 30, 2017

(65) Prior Publication Data
US 2018/0259916 A1 Sep. 13, 2018

(30) Foreign Application Priority Data
Sep. 25, 2015 (DE) .......................... 10 2015 218 472

(51) Int. Cl.
*G05B 13/02* (2006.01)
(52) U.S. Cl.
CPC ................................. *G05B 13/021* (2013.01)
(58) Field of Classification Search
None
See application file for complete search history.

(56) References Cited

U.S. PATENT DOCUMENTS

| | | | |
|---|---|---|---|
| 2009/0112534 A1* | 4/2009 | Gilg | G05B 13/024 703/2 |
| 2010/0004771 A1* | 1/2010 | Fahl | G06Q 10/043 700/103 |

(Continued)

FOREIGN PATENT DOCUMENTS

| | | |
|---|---|---|
| DE | 19510343 A1 | 9/1996 |
| DE | 102009006671 B4 | 8/2010 |

(Continued)

OTHER PUBLICATIONS

Andrews M. et al.: "Optimal utility based multi-user throughput allocation subject to throughput constraints", INFOCOM 2005. 24th Annual Joint Conference of the IEEE Computer and Co Mmunications Societies. Proceedings IEEE Miami, FL, USA, Piscataway, NJ, USA.IEEE, Piscataway, NJ, USA, Bd. 4, Mar. 13, 2005 (Mar. 13, 2005), pp. 2415-2424, XP010829270; DOI: 10.1109/INFCOM.2005.1498527; ISBN: 978-0-7803-8968-7; 2005.

(Continued)

*Primary Examiner* — Ryan A Jarrett
(74) *Attorney, Agent, or Firm* — Schmeiser, Olsen & Watts LLP (57) ABSTRACT

Provided is a method for operating a system including components controllable by control variables, including the determining of at least one optimized control variable at an optimization period for minimizing or maximizing a target function of the system in such a way that at least one system variable fulfills predetermined secondary conditions with respect to the control period, wherein the determining includes the establishment of an evaluation function for each of the secondary conditions to evaluate a change of the system variable at the end of the optimization period based on a current value of the system variable at the beginning of the optimization period, based on a gradient of the system variable relating to the secondary condition and maximally (Continued)

achievable over the control period, and based on a gradient relating to the secondary condition and minimally achievable over the control period.

15 Claims, 4 Drawing Sheets

(56) References Cited

U.S. PATENT DOCUMENTS

| | | | |
|---|---|---|---|
| 2010/0100218 A1* | 4/2010 | Weinzierl | C21D 11/005 700/104 |
| 2010/0191384 A1 | 7/2010 | Jurkat | |
| 2014/0025214 A1 | 1/2014 | Ito et al. | |
| 2015/0316901 A1* | 11/2015 | Wenzel | G06Q 10/04 700/291 |
| 2016/0223214 A1* | 8/2016 | Turner | G01N 25/18 |

FOREIGN PATENT DOCUMENTS

| | | |
|---|---|---|
| DE | 102013214287 A1 | 1/2014 |
| WO | WO 2009150121 A1 | 12/2009 |

OTHER PUBLICATIONS

Mattmüller Jan et al.: "Calculating a near time-optimal jerk-constrained trajectory along a specified smooth path", The International Journal of Advanced Manufacturing Technology, Springer, Berlin, DE, Bd. 45, Nr. 9-10, Apr. 19, 2009 (Apr. 19, 2009), pp. 1007-1016; XP019755900; ISSN: 1433-3015, DOI:10.1007/S00170-009-2032-9 ; 2009.

PCT International Search Report and written Opinion of International Searching Authority dated Nov. 25, 2016 corresponding to PCT International Application No. PCT/EP2016/072005 filed Sep. 16, 2016.

* cited by examiner

METHOD AND APPARATUS FOR OPERATING A TECHNICAL SYSTEM

CROSS-REFERENCE TO RELATED APPLICATIONS

This application claims priority to PCT Application No. PCT/EP2016/072005, having a filing date of Sep. 16, 2016, based on German Application No. 10 2015 218 472.2, having a filing date of Sep. 25, 2015, the entire contents both of which are hereby incorporated by reference.

FIELD OF TECHNOLOGY

The following relates to a method for operating a technical system having a number of components, controllable by controlled variables, during a control period comprising a multiplicity of optimization periods. Moreover, the following relates to a a computer program product (non-transitory computer readable storage medium having instructions, which when executed by a processor, perform actions) for performing such a method and to an apparatus for operating a technical system having a number of components, controllable by means of controlled variables, during a control period comprising a multiplicity of optimization periods.

BACKGROUND

To operate a technical system, such as a water network or a power supply network, for example, optimization algorithms or mathematical optimization methods are frequently employed. The optimization algorithms are used in order to achieve a predetermined target, in particular to minimize or maximize the target function. For the example of a water network, the target function may relate, by way of example, to the minimization of a power consumption for the pumps and treatment of the water. The optimization algorithm is used to optimize particular controlled variables that are used to adjust the controllable components of the technical system, for example pumps and valves of the water network. The optimization can be used to generate control plans for all the controllable processes or components in the network-like system, frequently for a relatively short optimization period, for example of 24 hours.

In order to be able to provide suitable control plans, the optimization algorithm needs to take into consideration a few technical constraints or secondary conditions, for example particular limit values for the controllable components, such as pumps or valves. Further examples thereof are minimum or maximum values of system variables, such as e.g. predetermined threshold values for capacities of processing steps for the water or minimum or maximum fill levels of reservoirs for the example of a water network. Many of these conditions can be evaluated directly or else within a short optimization period of, by way of example, 24 hours. However, constraints or secondary conditions also exist that necessitate a larger observation horizon, for example of a few weeks, months or years. Examples of long-term secondary conditions of this kind are production targets, such as a particular flow of water per month or maximum operating periods for pumps per month or year. Long-term secondary conditions of this kind cannot be modeled by conventional constraints within a contrastingly shorter optimization period. A simple approach to take into consideration long-term secondary conditions is to expand the optimization period to this long-term period. However, this disadvantageously results in a lengthened execution time for the optimization algorithm that, by way of example, may even be too long in some applications.

A further conventional approach to process long-term secondary conditions is to transform them into simple hard constraints within the shorter optimization period. This can be realized by simple arithmetic operations or stochastic distributions. However, these approaches have the disadvantage of not always being able to provide the best solution for the operation of the water network over the whole control period.

SUMMARY

An aspect relates to the operation of a technical system, such as a water network, for example.

Accordingly, a method for operating a technical system having a number of components, controllable by means of controlled variables, during a control period comprising a multiplicity of optimization periods is proposed. The method comprises the following steps:

ascertaining at least one optimized controlled variable for each of the optimization periods for minimizing or maximizing a target function of the system such that at least one system variable satisfies a number of predetermined secondary conditions referenced to the control period, wherein the ascertaining comprises:
  specifying a rating function for each of the secondary conditions for rating a change in the system variable at the end of the optimization period based on a present value of the system variable at the beginning of the optimization period, a gradient of the system variable that is referenced to the secondary condition and attainable as a maximum over the control period and a gradient of the system variable that is referenced to the secondary condition and attainable as a minimum over the control period, and
  applying an optimization algorithm for minimizing or maximizing the target function using the specified rating functions, wherein the at least one system variable is ascertained as a system response to the at least one optimized controlled variable of the controllable components, and
adjusting the at least one ascertained optimized controlled variable for operation of the controllable components.

The technical system is, by way of example, a network-like system, such as a water network or a power supply network. The controllable components, for example of a water network, are in particular pumps and valves. The optimization period of the optimization algorithm can also be referred to as an optimization horizon. For the example of the water network, the optimization period may be 24 hours, for example. The control period can also be regarded as an observation period or observation horizon and is 30 days, for example. For this example, the control period comprises 30 optimization periods.

The system variable is, for example for a water network, an accumulated flow of water at a particular point in the water network, for example at a pump. A controlled variable is then used to actuate the pump.

The secondary condition referenced to the control period can also be referred to as a long-term secondary condition on account of its reference to the control period, which is much longer than the optimization period.

According to the present method, rating functions, in particular with function values between 0 and 1, are specified for long-term secondary conditions, the respective rating function being able to have a penalty function specified for it that can easily be added to the target function as a summand.

Thereafter, long-term secondary conditions are adequately taken into account in the application of the optimization for each optimization period. In particular, the long-term secondary conditions are taken into account without the optimization period needing to be extended or lengthened. As a result, the necessary computation outlay for the present method is also barely increased. For this reason, the feasibility of the present optimization is also certain for an online application.

In contrast to conventional approaches, the present method does not involve long-term secondary conditions being broken down into shorter optimization periods, for example by simple arithmetic operations, such as equal distribution. In comparison with conventional approaches of this kind, the present method is much more flexible. Moreover, in the present case the specified rating function provides a simple interface to the optimization algorithm, since the rating function in particular has only function values between 0 and 1 that need to be transferred to the optimization algorithm. For this reason, it is not necessary to modify the optimization algorithm. As already explained above, only a penalty function is added to the target function based on the specified rating function. Consequently, only a preparation step is needed that transforms the rating function into a valid penalty function that satisfies predetermined and algorithm-specific basic conditions. An example of an optimization algorithm is the SQP algorithm (SQP; sequential quadratic programming).

For each long-term secondary condition (and possibly accumulated values), a rating function is specified. This involves maximum and minimum gradients of the system variable being specified, in particular by means of derivation from technical and logical constraints. By way of example, a pump can run for no more than 24 hours per day minus maintenance time. Another example is that the maximum flow of water through a pump is the sum total of water if the pump runs constantly for 24 hours. Besides linear and constant gradients of this kind, it is also possible to predict nonlinear bounds for any progression. If, by way of example, a particular period for maintenance is planned at a particular time, the gradient can be modeled as a horizontal line for this period.

The respective rating function is specified at the beginning of the control period preferably once so as then to be able to be used for each of the optimization periods within the control period.

According to one embodiment, the value range of the rating function is between 0 and 1.

According to a further embodiment, the system variable describes an accumulated value over the control period.

According to a further embodiment, the rating function is set up to rate (to evaluate) the long-term secondary condition on the basis of the change in the accumulated system variable in the optimization period.

In this case, the rating function is introduced in order to rate or to evaluate the accumulated value of the system variable at the end of the respective present short-term optimization period.

According to a further embodiment, before the specification of the rating function, such changes in the system variable as necessitate a value of the system variable, determined on the basis of the gradient of the system variable attainable as a maximum over the control period and on the basis of the gradient of the system variable attainable as a minimum over the control period, that does not satisfy the long-term secondary condition are excluded.

This determines valid distributions for the change of the system variable. A distribution or a value of a system variable is as explained above invalid if it results in a situation in which the condition can no longer be satisfied, independently of future optimization steps.

According to a further embodiment, the method comprises:
specifying a penalty function with the specified rating function as an argument,
extending the target function by the specified penalty function, and
applying the optimization algorithm to the extended target function.

According to a further embodiment, the rating function is specified such that its function value is equal to 0 if, based on the maximum attainable gradient of the system variable and based on the minimum attainable gradient of the system variable, it is certain that the secondary condition is satisfied from the present time to the end of the control period.

According to a further embodiment, the rating function is specified such that its function value is greater than 0 and less than or equal to 1 if, based on the maximum attainable gradient of the system variable and based on the minimum attainable gradient of the system variable, it is certain that the secondary condition continues to be satisfiable from a present time to the end of the control period.

According to a further embodiment, the rating function is specified such that its function value is equal to 1 if, based on the maximum attainable gradient of the system variable and based on the minimum attainable gradient of the system variable, it is certain that the secondary condition is not satisfiable from present time to the end of the control period.

According to a further embodiment, the rating function for the minimum value problem is specified by $$X(\Delta V) = \begin{cases} \dfrac{V_2(t_0 + T_{opt}) - V_0 - \Delta V}{V_2(t_0 + T_{opt}) - V_1^{t_0+T_{opt}}}, & \text{if } \Delta V < V_1(t_0 + T_{opt}) - V_0 \\ 0, & \text{otherwise} \end{cases}$$

wherein V denotes the system variable, the $\Delta V$ denotes the change in the system variable, $t_0$ denotes the present time, $T_{opt}$ denotes the optimization period, $V_0$ denotes a present value of the system variable at the beginning of the optimization period, $V_1$ denotes a gradient of the system variable attainable as a maximum over the control period and $V_2$ denotes a gradient of the system variable attainable as a minimum over the control period.

According to a further embodiment, besides the introduction of the rating function, a hard constraint as follows is added:

$$\Delta V \geq V_1(t_0+T_{opt})-V_0$$

According to a further embodiment, the rating function for the maximum value problem is specified by $$X(\Delta V) = \begin{cases} \dfrac{V_0 + \Delta V - V_1(t_0 + T_{opt})}{V_2(t_0 + T_{opt}) - V_1^{t_0+T_{opt}}}, & \text{if } \Delta V > V_1(t_0 + T_{opt}) - V_0 \\ 0, & \text{otherwise} \end{cases}$$

According to a further embodiment, besides the introduction of the rating function, a hard constraint as follows is added:

$$\Delta V \leq V_2(t_0+T_{opt})-V_0$$

According to a further embodiment, the technical system is a network-like installation, a power supply network or a water mains.

According to a further embodiment, the number of controllable components comprises a valve and/or a pump.

According to a further embodiment, the number of controllable components comprises a converter, a transformer, a power station and/or transformer substation.

In addition, a computer program product is proposed that prompts the performance of the method as explained above on a program-controlled device.

A computer program product, such as e.g. a computer program means, can, by way of example, be provided or supplied as a storage medium, such as e.g. a memory card, USB stick, CD-ROM, DVD, or else in the form of a downloadable file from a server in a network. This can be done in a wireless communication network, for example, by the transmission of an appropriate file with the computer program product or the computer program means.

Further, an apparatus for operating a technical system having a number of components, controllable by means of controlled variables, during a control period comprising a multiplicity of optimization periods is proposed. The apparatus comprises a first unit and a second unit. The first unit is set up to ascertain at least one optimized controlled variable for each of the optimization periods for maximizing or minimizing a target function of the system such that at least one system variable satisfies a number of predetermined secondary conditions referenced to the control period, wherein the ascertaining comprises specifying a rating function for each of the secondary conditions for rating a change in the system variable at the end of the optimization period based on a present value of the system variable at the beginning of the optimization period, a gradient of the system variable that is referenced to the secondary condition and attainable as a maximum over the control period and a gradient of the system variable that is referenced to the secondary condition and attainable as a minimum over the control period, and applying an optimization algorithm for minimizing or maximizing the target function using the specified rating functions, wherein the at least one system variable is ascertained as a system response to the at least one optimized controlled variable of the controllable components. The second unit is set up for adjusting the at least one ascertained optimized controlled variable for operation of the controllable components.

The respective unit, for example the first unit, may be implemented on a hardware basis and/or also on a software basis. In the case of a hardware-based implementation, the respective unit may be configured as an apparatus or as part of an apparatus, for example as a computer or as a microprocessor or as a control computer of a vehicle. In the case of a software-based implementation, the respective unit may be configured as a computer program product, as a function, as a routine, as part of a program code or as an executable object.

The embodiments and features described for the proposed method apply to the proposed apparatus accordingly.

Further possible implementations of the following also comprise combinations, not mentioned explicitly, of features or embodiments described above or below in respect of the exemplary embodiments. In this case, a person skilled in the art will also add individual aspects as improvements or augmentations to the respective basic form of the following.

BRIEF DESCRIPTION

Some of the embodiments will be described in detail, with references to the following Figures, wherein like designations denote like members, wherein.

DETAILED DESCRIPTION

In the figures that follow, embodiments of the invention are sometimes described using the example of a water network as a technical system with pumps and valves as examples of controllable components. The system variable is, by way of example, a flow of water accumulated over a control period at a particular point in the water network, for example at a pump. A controlled variable is used to actuate this pump.

Figure 1:
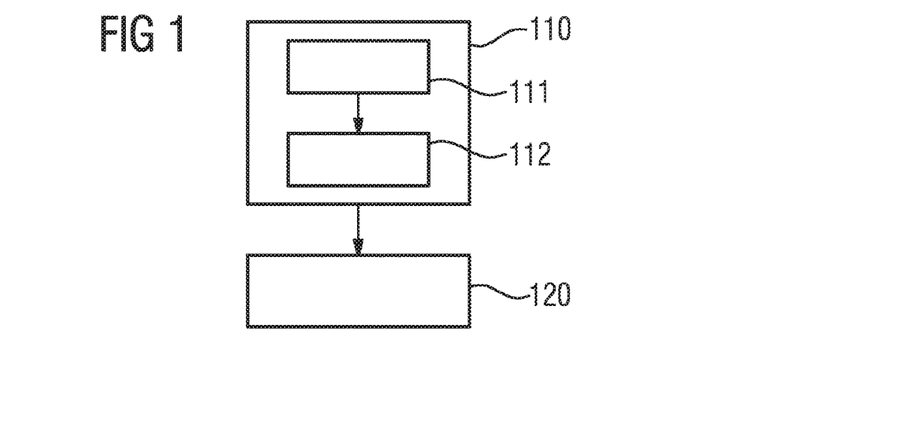
FIG. 1 shows a schematic flowchart for a first exemplary embodiment of a method for operating a technical system.

FIG. 1 depicts a schematic flowchart for a first exemplary embodiment of a method for operating a technical system 1 having a number of components 21-25 (see FIG. 8), controllable by means of controlled variables, during a control period $T_s$ comprising a multiplicity of optimization periods $T_{opt}$.

As already explained above, the technical system 1 is, by way of example, a water network and the controllable components comprise, by way of example, valves and/or pumps. The system variable V(t) describes, by way of example, a value of the flow of water at a particular point in the water network as accumulated over the control period $T_s$.

Figure 2:
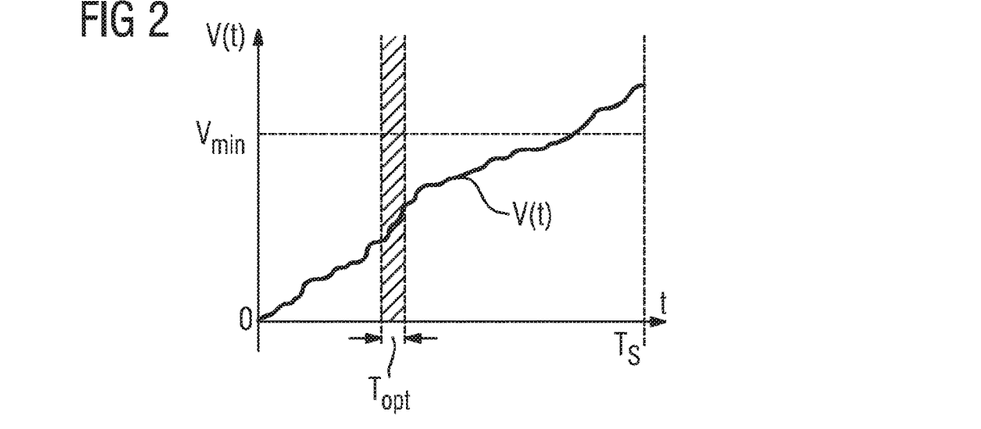
FIG. 2 shows a graph to illustrate a minimum value problem for the system parameter over the control period.

In this regard, FIG. 2 shows a graph to illustrate a minimum value problem $V_{min}$ for the system variable V(t) of the accumulated flow of water over the control period $T_s$. The minimum value problem states that the accumulated flow of water V(t) at the end of the control period $T_s$ must be at least the value $V_{min}$.

Figure 3:
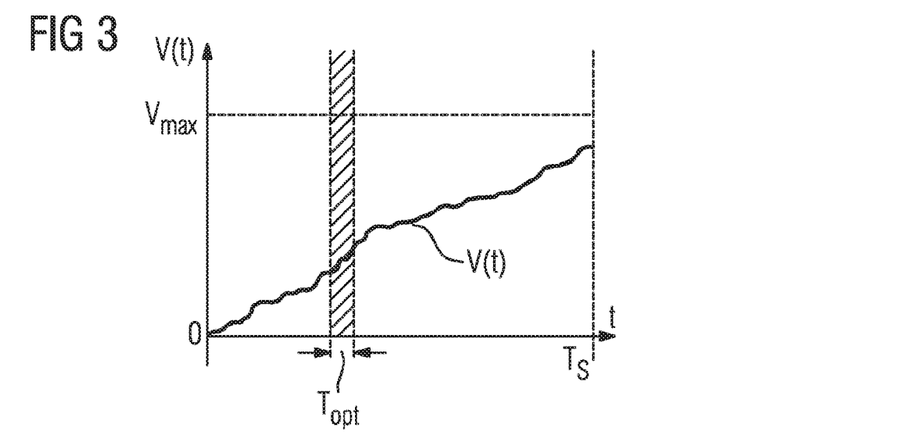
FIG. 3 shows a graph to illustrate a maximum value problem for the system parameter over the control period.

Analogously, FIG. 3 shows a graph to illustrate a maximum value problem $V_{max}$ for the system variable V(t) over the control period $T_s$. The secondary condition $V_{max}$ states that the accumulated flow of water V(t) at the end of the control period $T_s$ must be no more than the value of $V_{max}$.

In summary, the value of V(t=$T_s$) at the end of the control period $T_s$ must preferably be greater than or equal to $V_{min}$ and less than or equal to $V_{max}$. Moreover, FIGS. 2 and 3 show a present optimization period $T_{ops}$ that is much shorter than the control period $T_s$. By way of example, the optimization period $T_{opt}$ is 24 hours, whereas the control period $T_s$ is 30 days.

The first exemplary embodiment of the method of FIG. 1 has method steps 110 and 120.

In step 110, a set of optimized controlled variables for the respective optimization period $T_{opt}$ to attain a minimization or maximization of the target function of the system 1 is ascertained such that the system variable V(t) satisfies the two secondary conditions $V_{min}$, $V_{max}$. The target function of a water network as system 1 is, by way of example, a minimum power consumption of the water network 1. Without restricting the generality, only two secondary conditions, namely $V_{min}$ and $V_{max}$, are discussed in this example. For reasons of clarity, the explanation below is reduced to the secondary condition $V_{min}$. For the secondary condition $V_{max}$, the method is carried out analogously.

Step 110 comprises step 111 for each of the secondary conditions $V_{min}$, $V_{max}$ and step 112. Step 111 is carried out once at the beginning of the control period $T_s$. Step 112 is carried out for each optimization period $T_{ops}$ within the control period $T_s$ with all the secondary conditions $V_{min}$, $V_{max}$.

As already stated above, step 111 is explained only for the secondary condition $V_{min}$:

In step 111, a rating function $X(\Delta V)$ is specified for the secondary condition $V_{min}$ for rating a change $\Delta V$ in the system variable V(t) at the end of the respective optimization period $T_{opt}$ based on a present value $V_0$ of the system variable V(t) at the beginning $t_0$ of the optimization period $T_{opt}$, a gradient $V_1(t)$ (see FIG. 5) of the system variable V(t) that is referenced to the secondary condition $V_{min}$ and attainable as a maximum over the control period and a gradient $V_2(t)$ (see FIG. 5) of the system variable V(t) that is referenced to the secondary condition $V_{min}$ and attainable as a minimum over the control period $T_s$.

Step 111 of FIG. 1 can comprise, before the specification of the rating function $X(\Delta V)$, such changes in the system variable V(t) as necessitate a value of the system variable V(t), determined on the basis of the gradient $V_1(t)$ of the system variable V(t) attainable as a maximum over the control period $T_s$ and on the basis of the gradient $V_2(t)$ of the system variable V(t) attainable as a minimum over the control period $T_s$, that does not satisfy the long-term secondary condition being excluded.

Figure 4:
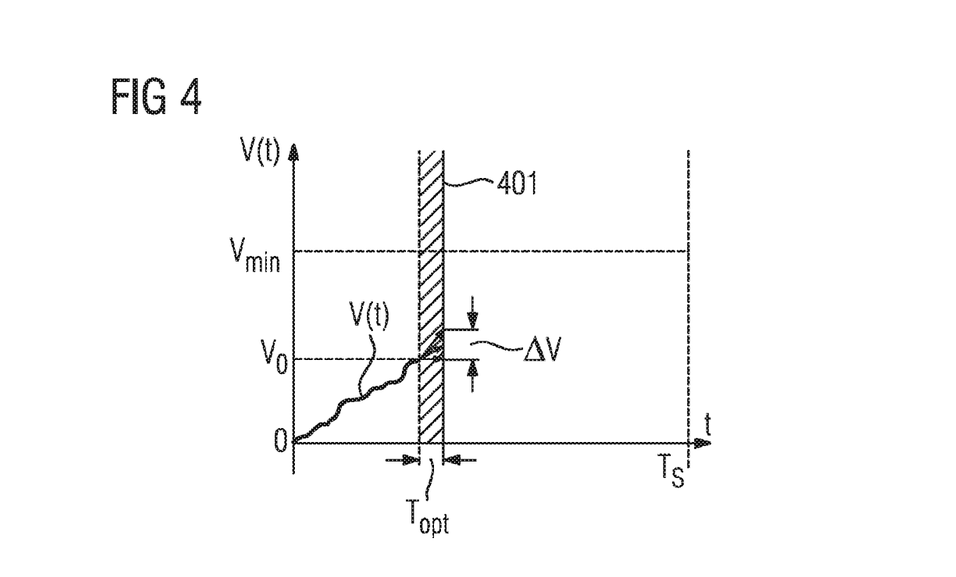
FIG. 4 shows a graph to illustrate possible values of the change in the system parameter during an optimization period within the control period.

In this regard, FIG. 4 shows a graph to illustrate possible values of the change $\Delta V$ in the system variable V(t) after an optimization period $T_{opt}$. The line 401 in FIG. 4 illustrates that the rating function $X(\Delta V)$ exists only on this line 401. The value range of the rating function $X(\Delta V)$ is between 0 and 1.

Figure 5:
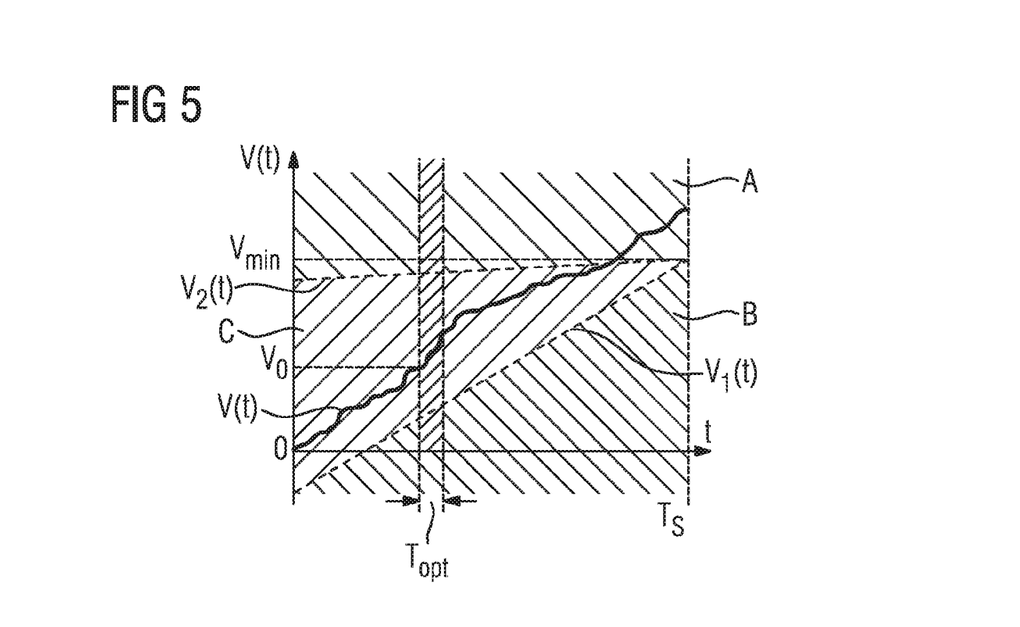
FIG. 5 shows a graph to illustrate the time characteristics of the system parameter, the maximum attainable gradient of the system parameter and the minimum attainable gradient of the system parameter over the control period.

Further, in this regard, FIG. 5 shows a graph to illustrate the time characteristics of the system variable V(t), the maximum attainable gradient $V_1(t)$ of the system variable V(t) and the minimum attainable gradient $V_2(t)$ of the system variable V(t) over the control period $T_s$. The two gradients $V_1(t)$ and $V_2(t)$ are referenced to the secondary condition $V_{min}$, discussed at present.

If the function value of the system variable V(t) is greater than $V_2(t)$ at a time during the control period $T_s$ (see area A in FIG. 5), then it is certain that the secondary condition $V_{min}$ is always satisfied and can no longer be broken. If, however, the function value of the system variable V(t) is less than $V_1(t)$ at a time during the control period $T_s$, then the secondary condition $V_{min}$ can no longer be satisfied (see area B in FIG. 5).

For these reasons, the rating function $X(\Delta V)$ is preferably specified as follows:

The rating function $X(\Delta V)$ is specified such that its function value is equal to 0 if, based on the maximum attainable gradient $V_1(t)$ of the system variable V(t) and based on the minimum attainable gradient $V_2(t)$ of the system variable V(t), it is certain that the secondary condition is satisfied from the present time $t_0$ to the end of the control period $T_s$ (see area A in FIG. 5).

Moreover, the rating function $X(\Delta V)$ is specified such that its function value is greater than 0 and less than or equal to 1 if, based on the maximum attainable gradient $V_1(t)$ of the system variable V(t) and based on the minimum attainable gradient $V_2(t)$ of the system variable V(t), it is certain that the secondary condition $V_{min}$ continues to be satisfiable from the present time $t_0$ to the end of the control period $T_s$ (see area C in FIG. 5). In other words, the secondary condition can still be satisfied in this case, but also broken.

Further, the rating function $X(\Delta V)$ is specified such that its function value would be equal to 1 if, based on the maximum attainable gradient $V_1(t)$ of the system variable V(t) and based on the minimum attainable gradient $V_2(t)$ of the system variable V(t), it is certain that the secondary condition $V_{min}$ is not satisfiable from the present time $t_0$ (at the beginning of the optimization period $t_0$) to the end of the control period $T_s$ (see area B in FIG. 5).

Accordingly, the rating function $X(\Delta V)$ for the minimum value problem can be specified by $$X(\Delta V) = \begin{cases} \dfrac{V_2(t_0 + T_{opt}) - V_0 - \Delta V}{V_2(t_0 + T_{opt}) - V_1^{t_0 + T_{opt}}}, & \text{if } \Delta V < V_1(t_0 + T_{opt}) - V_0 \\ 0, & \text{otherwise} \end{cases}$$

wherein V denotes the system variable, $\Delta V$ denotes the change in the system variable, $t_0$ denotes the present time, $T_{opt}$ denotes the optimization period, $V_0$ denotes a present value of the system variable, $V_1$ denotes a gradient of the system variable attainable as a maximum over the control period and $V_2$ denotes a gradient of the system variable attainable as a minimum over the control period.

Further, besides the introduction of the rating function $X(\Delta V)$ the following hard constraint is added:

$$\Delta V \geq V_1(t_0 + T_{opt}) - V_0$$

Figure 6:
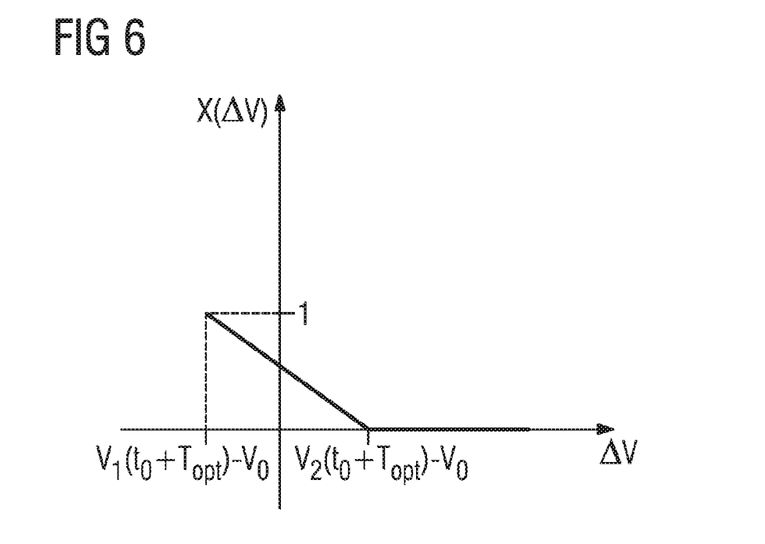
FIG. 6 shows a graph to illustrate a rating function for the secondary condition of the minimum attainable gradient of the system parameter.

A graphical depiction of this rating function $X(\Delta V)$ is shown by FIG. 6.

In step 111, an optimization algorithm for minimizing or maximizing the target function using the specified rating functions is applied, wherein the at least one system variable V(t) is ascertained as a system response to the at least one optimized controlled variable.

In step 120, the at least one ascertained optimized controlled variable is adjusted for operation of the controllable components 21-25.

Figure 7:
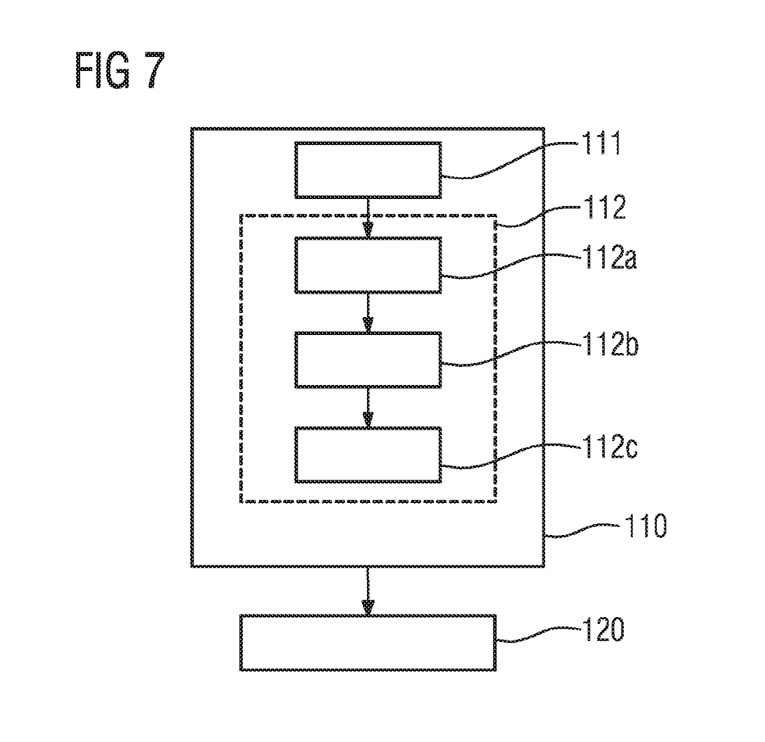
FIG. 7 shows a schematic flowchart for a second exemplary embodiment of a method for operating a technical system.

FIG. 7 depicts a schematic flowchart for a second exemplary embodiment of a method for operating a technical system 1 having a number of components 21-25, controllable by means of controlled variables, during a control period $T_s$ comprising a multiplicity of optimization periods $T_{opt}$.

The method of FIG. 7 comprises steps 110 and 120 (analogously to FIG. 1), wherein step 110 comprises step 111 and step 112 with substeps 112a, 112b and 112c.

In step 110, a set of optimized controlled variables for the respective optimization period $T_{opt}$ for minimizing or maximizing the target function of the system 1 is ascertained such that the system variable V(t) satisfies the two secondary conditions $V_{min}$, $V_{max}$. The target function of a water network as system 1 is, by way of example, a minimum power consumption of the water network 1.

In step 111, a rating function $X(\Delta V)$ for the secondary condition $V_{min}$ for rating a change $\Delta V$ in the system variable V(t) at the end of the respective optimization period $T_{opt}$ based on a present value $V_0$ of the system variable V(t) at the beginning $t_0$ of the optimization period $T_{opt}$, a gradient $V_1(t)$ (see FIG. 5) of the system variable V(t) that is referenced to the secondary condition $V_{min}$ and attainable as a maximum over the control period and a gradient $V_2(t)$ (see FIG. 5) of the system variable V(t) that is referenced to the secondary condition $V_{min}$ and attainable as a minimum over the control period $T_s$ is specified.

Step 112 comprises, as explained above, substeps 112a, 112b and 112c:

In step 112a, a penalty function with the specified rating function $X(\Delta V)$ as an argument is specified.

In step 112b, the target function is extended by the specified penalty function. In particular, the penalty function is added to the target function as a summand. Steps 112a and 112b are performed for each rating function $X(\Delta V)$ and hence for each long-term secondary condition.

In step 112c, the optimization algorithm is applied to the extended target function.

Figure 8:
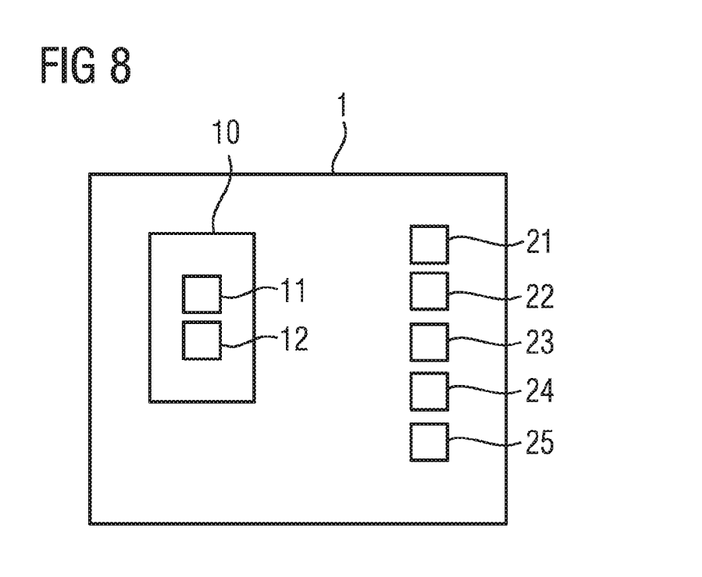
FIG. 8 shows a schematic block diagram of an apparatus for operating a technical system.

FIG. 8 shows a schematic block diagram of an apparatus 10 for operating a technical system 1 having a number of components 21-25, controllable by means of controlled variables, during a control period $T_s$ comprising a multiplicity of optimization periods $T_{opt}$. The technical system 1 is, by way of example, a water network. The controllable components 21-25 comprise, by way of example, pumps or valves. Moreover, the water network 1 can also comprise noncontrollable components such as pipes or the like. Without restricting the generality, the system 1 of FIG. 8 shows five controllable components 21-25. Each of the controllable components 21-25 has in particular one or more associated controlled variables.

The apparatus 10 comprises a first unit 11 and a second unit 12. The first unit 11 is set up to ascertain at least one controlled variable for each of the optimization periods $T_{opt}$ for maximizing or minimizing a target function of the system 1 such that at least one system variable V(t) satisfies a number of predetermined secondary conditions $V_{min}$, $V_{max}$ referenced to the control period $T_s$, wherein the ascertaining comprises specifying a rating function $X(\Delta V)$ for each of the secondary conditions $V_{min}$, $V_{max}$ for rating a change in the system variable V(t) at the end of the optimization period $T_{opt}$ based on a present value $V_0$ of the system variable V(t) at the beginning of the optimization period $T_{opt}$, a gradient $V_1(t)$ of the system variable that is referenced to the secondary condition $V_{min}$, $V_{max}$ and attainable as a maximum over the control period $T_s$ and a gradient $V_2(t)$ of the system variable that is referenced to the secondary condition $V_{min}$, $V_{max}$ and attainable as a minimum over the control period, and applying an optimization algorithm for minimizing or maximizing the target function using the specified rating functions $X(\Delta V)$, wherein the at least one system variable V(t) is ascertained as a system response to the at least one optimized controlled variable of the controllable components.

The second unit 12 is set up to adjust the at least one ascertained optimized controlled variable for operation of the controllable components.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for operating a technical system having a number of components, controllable by controlled variables, during a control period comprising a multiplicity of optimization periods, involving:
   a) ascertaining at least one optimized controlled variable for each of the optimization periods for minimizing or maximizing a target function of the technical system such that at least one system variable satisfies a number of predetermined secondary conditions referenced to the control period, wherein the ascertaining comprises:
      specifying a rating function for each of the predetermined secondary conditions for rating a change in the system variable at an end of each of the optimization periods based on a present value of the system variable at a beginning of the optimization period, a first gradient of the system variable that is referenced to the predetermined secondary condition and attainable as a maximum over the control period and a second gradient of the system variable that is referenced to the predetermined secondary condition and attainable as a minimum over the control period, and
      applying an optimization algorithm for minimizing or maximizing the target function using the specified rating functions, wherein the at least one system variable is ascertained as a system response to the at least one optimized controlled variable of the controllable components, and
   b) adjusting the at least one ascertained optimized controlled variable for an operation of the controllable components.

2. The method as claimed in claim 1,
further comprising:
specifying a penalty function with the specified rating function as an argument,
extending the target function by the specified penalty function, and
applying the optimization algorithm to the extended target function.

3. The method as claimed in claim 1,
wherein a value range of the rating function is between 0 and 1.

4. The method as claimed in claim 1,
wherein the rating function is specified such that its function value is equal to 0 if, based on the maximum attainable first gradient of the system variable and based on the minimum attainable second gradient of the system variable, it is certain that the predetermined secondary condition is satisfied from a present time to the end of the control period.

5. The method as claimed in claim 1,
wherein the rating function is specified such that its function value is greater than 0 and less than or equal to 1 if, based on the maximum attainable first gradient of the system variable and based on the minimum attainable second gradient of the system variable, it is certain that the predetermined secondary condition continues to be satisfiable from the present time to the end of the control period.

6. The method as claimed in claim 1, wherein the rating function is specified such that its function value is equal to 1 if, based on the maximum attainable first gradient of the system variable and based on the minimum attainable second gradient of the system variable, it is certain that the predetermined secondary condition is not satisfiable from a present time to the end of the control period.

7. The method as claimed in claim 1, wherein the rating function for a minimum value problem is specified by $$X(\Delta V) = \begin{cases} \dfrac{V_2(t_0 + T_{opt}) - V_0 - \Delta V}{V_2(t_0 + T_{opt}) - V_1^{t_0 + T_{opt}}}, & \text{if } \Delta V < V_1(t_0 + T_{opt}) - V_0 \\ 0, & \text{otherwise} \end{cases}$$

wherein V denotes the system variable, $\Delta V$ denotes the change in the system variable, $t_0$ denotes a present time, $T_{opt}$ denotes the optimization period, $V_0$ denotes the present value of the system variable, $V_1$ denotes the first gradient of the system variable attainable as the maximum over the control period and $V_2$ denotes the second gradient of the system variable attainable as the minimum over the control period.

8. The method as claimed in claim 7, wherein besides an introduction of the rating function, a hard constraint is added that is:

$$\Delta V \geq V_1(t_0 + T_{opt}) - V_0.$$

9. The method as claimed in claim 1, wherein the system variable describes an accumulated value over the control period.

10. The method as claimed in claim 1, wherein the rating function is set up to rate the predetermined secondary condition on a basis of the change in an accumulated system variable in the optimization period.

11. The method as claimed in claim 1, wherein before a specification of the rating function, such changes in the system variable as necessitate a value of the system variable, determined on a basis of the first gradient of the system variable attainable as the maximum over the control period and on the basis of the second gradient of the system variable attainable as the minimum over the control period, that does not satisfy the predetermined secondary condition are excluded.

12. The method as claimed in claim 1, wherein the technical system is a network-like installation, a power supply network or a water mains.

13. The method as claimed in claim 1, wherein the number of controllable components comprises a valve and/or a pump or in that the number of controllable components comprises a converter, a transformer, a power station and/or a transformer substation.

14. A computer program product comprising a (non-transitory computer readable storage medium having instructions, which when executed by a processor, perform actions that prompts a performance of the method as claimed in claim 1 on a program-controlled device.

15. An apparatus for operating a technical system having a number of components, controllable by controlled variables, during a control period comprising a multiplicity of optimization periods, having:
a) a first unit for ascertaining at least one controlled variable for each of the optimization periods for maximizing or minimizing a target function of the technical system such that at least one system variable satisfies a number of predetermined secondary conditions referenced to the control period, wherein the ascertaining comprises specifying a rating function X for each of the predetermined secondary conditions for rating a change in the system variable at an end of the optimization period based on a present value of the system variable at a beginning of the optimization period, a first gradient of the system variable that is referenced to the predetermined secondary condition and attainable as a maximum over the control period and a second gradient $V_2$ of the system variable that is referenced to the predetermined secondary condition and attainable as a minimum over the control period, and applying an optimization algorithm for minimizing or maximizing the target function using the specified rating functions, wherein the at least one system variable V is ascertained as a system response to the at least one optimized controlled variable of the controllable components, and
b) a second unit for adjusting the at least one ascertained optimized controlled variable for operation of the controllable components.

* * * * *